Sept. 14, 1965 C. KLUGE 3,205,663
ARRANGEMENT FOR RELIEVING THE GUIDING MEANS OF SLIDING
MEMBERS OF A MOTION CONVERTER
Filed Sept. 14, 1964 4 Sheets-Sheet 1

Inventor:
Charlotte Kluge
By Walter Becker

Inventor:
Charlotte Kluge

Sept. 14, 1965   C. KLUGE   3,205,663
ARRANGEMENT FOR RELIEVING THE GUIDING MEANS OF SLIDING
MEMBERS OF A MOTION CONVERTER
Filed Sept. 14, 1964   4 Sheets-Sheet 4

Inventor:
Charlotte Kluge
By Walter Becker

United States Patent Office 3,205,663
Patented Sept. 14, 1965

3,205,663
ARRANGEMENT FOR RELIEVING THE GUIDING MEANS OF SLIDING MEMBERS OF A MOTION CONVERTER
Charlotte Kluge, Essen, Germany, assignor to Beteiligungs- und Patentverwaltungsgesellschaft mit beschrankter Haftung, Essen, Germany
Filed Sept. 14, 1964, Ser. No. 396,067
Claims priority, application Germany, Oct. 11, 1963, B 73,843
3 Claims. (Cl. 60—54.5)

The present invention relates to a motion converter, and, more specifically, to a converter for converting a reciprocatory movement into a rotary movement and vice versa. A converter of this type has become known according to which a displacement member cooperating with a reciprocatory machine element is connected to a rotor which in its turn through hydraulically operable means is connected to a rotary machine part. Partitions between pressure chambers of the rotary displacement member are formed by sliding members which during the rotation of the displacement member are reciprocated in axial direction in conformity with the contour of said pressure chambers. In the gap between the lateral surfaces of the sliding members and the housing surfaces guiding said sliding members there are provided recesses which, through the intervention of bores, communicate with pressure fluid acting upon said sliding members so that during the rotation of the displacement member the pressure forces acting upon said sliding members approximately balance each other. In this way, high bearing pressures will be avoided which otherwise would be produced at the end edges of the guiding surfaces for the sliding members in view of the fact that the fluid pressure always acts upon diametrically oppositely located end forces of the sliding member. Within a certain stroke range of the displacement member, the said forces would assume intolerable peak values. With the above outlined arrangement, however, the friction of the sliding member in its guiding means is considerably reduced whereby the safety of operation of the converter is increased.

For instance, each side surface of the sliding member is near one end thereof provided with recesses into which bores lead which start from the other end of the sliding member on the same side thereof. Instead, it is also possible to connect the recesses arranged on one side of the sliding member near one of its ends through one bore each with the oppositely located side of the sliding member on the same end. In this connection, the recesses and the mouths of the bores pertaining thereto are so arranged that to the extent to which the sliding member is moved outwardly at the respecive end, an increasing number of the mouths of the bores move out of the housing guiding the sliding member and pass into the respective chamber containing pressure fluid, whereas the recesses pertaining thereto remain inside said housing inasmuch as they are spaced from the end of the sliding member to a greater extent than the mouths of the bores. Consequently, an increasing number of recesses will receive pressure fluid so that the relieving force at the respective guiding surface edge will increase stepwise. Inversely, the relieving force is stepwise decreased when the respective sliding member end moves into the housing.

When the converter has a two-cyclinder stroke displacement member, according to the periodic pressure change in the cylinders, the pressure fluid will at each end of the sliding member alternately act upon the two sliding member sides, and, more specifically, always simultaneously upon two diametrically oppositely located end surfaces. In these instances, it is, therefore, necessary that recesses and bores of the above mentioned type are employed at both ends of the sliding member and symmetrically on both sides of the sliding member.

It is, of course, to be understood that the recesses in which relieving forces are produced by pressure fluid may be arranged in the guiding surfaces of the housing rather than in the guiding surfaces of the sliding members. The sliding member will then comprise as many bores extending from one side to the other side as there are recesses. These bores are arranged at such an incline that to the extent to which an end of the sliding member emerges from the housing stepwise, an increasing number of associated recesses are connected to pressure fluid, and the guiding edge pertaining thereto will be relieved correspondingly.

In all of the above mentioned instances, there is no complete equalization of the forces exerted by the pressure fluid upon the sliding members. This is due to the fact that, when axially displacing a sliding member, the forces exerted by the pressure fluid upon the ends of the sliding members, on one hand, and the corresponding tilting moments on the other hand continuously increase, whereas the counter forces change only stepwise inasmuch as this change is effected by adding to or subtracting individual recesses from the respective pressure fluid chambers.

It is an object of the present invention to improve converters of the above mentioned type, in which the relieving forces are changed continuously in conformity with the tilting moments which change with progressive axial displacement of the sliding members.

It is another object of this invention to provide an arrangement as set forth in the preceding paragraph which will considerably reduce the load on the guiding surfaces of the housing and on the side surfaces of the sliding member so that these forces will be reduced to a minimum.

These and other objects and advantages of the invention will appear more clearly from the following specification in connection with the accompanying drawings, in which.

Figure 4:
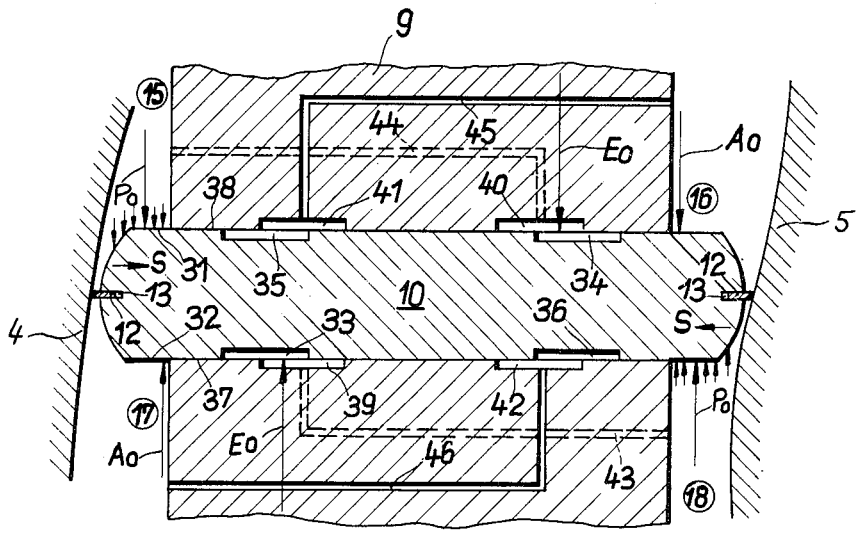
FIG. 4 shows a portion of the section of FIG. 3 with one of the sliding members on a larger scale than FIG. 3.
Figure 5:
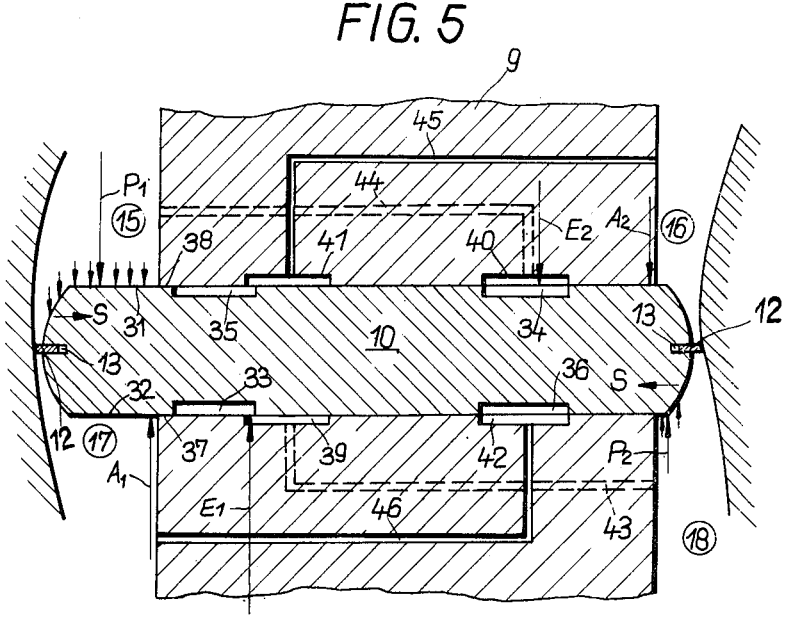
FIG. 5 represents a section corresponding to that of FIG. 4 but in another position of the rotor.
Figure 6:
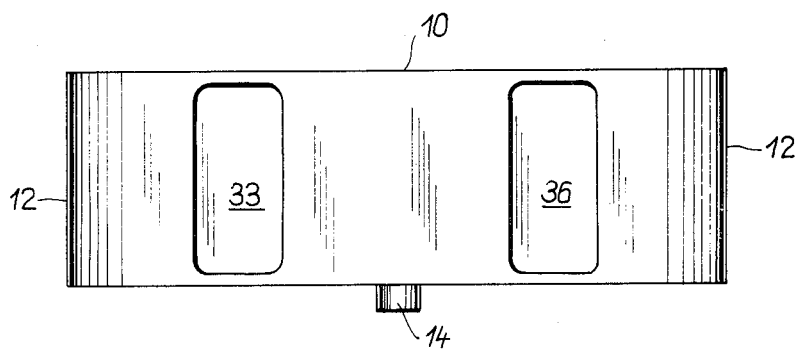
FIG. 6 is a side view of a sliding member.
Figure 7:
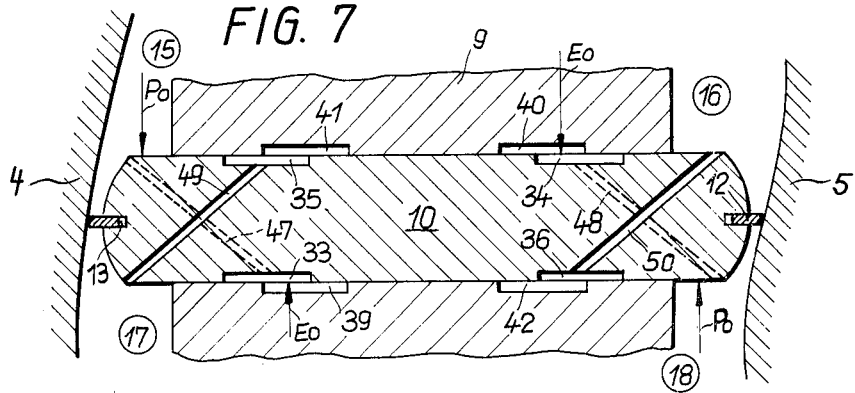
Figure 8:
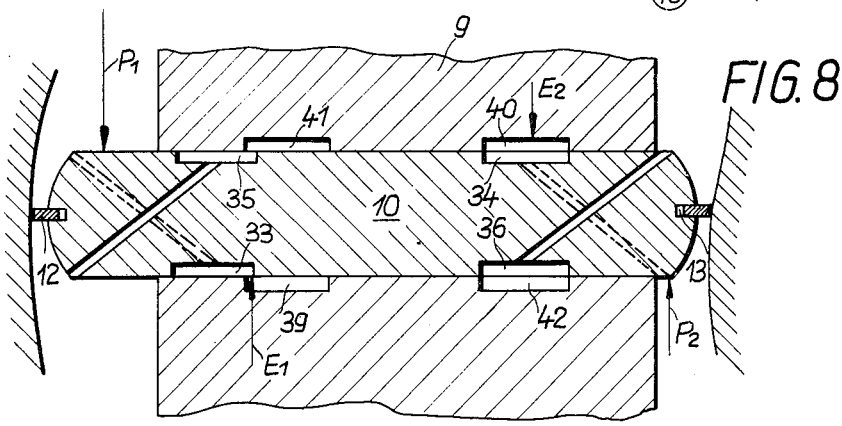

FIGS. 7 and 8 respectively illustrate sections corresponding to those of FIGS. 4 and 5 for differently designed bores through which the recesses for the relief of the sliding member are connected to the respective pressure chambers.

The present invention is characterized primarily in that each of the edges to be relieved of the guiding surfaces of the housing has associated therewith a pair of recesses which in the housing or in the sliding member are so arranged with a mutual overlap that the total effective surface of the pressure fluid in the two recesses will be all the greater the farther the sliding member moves outwardly with regard to the respective edge of the rotor.

Figure 1:
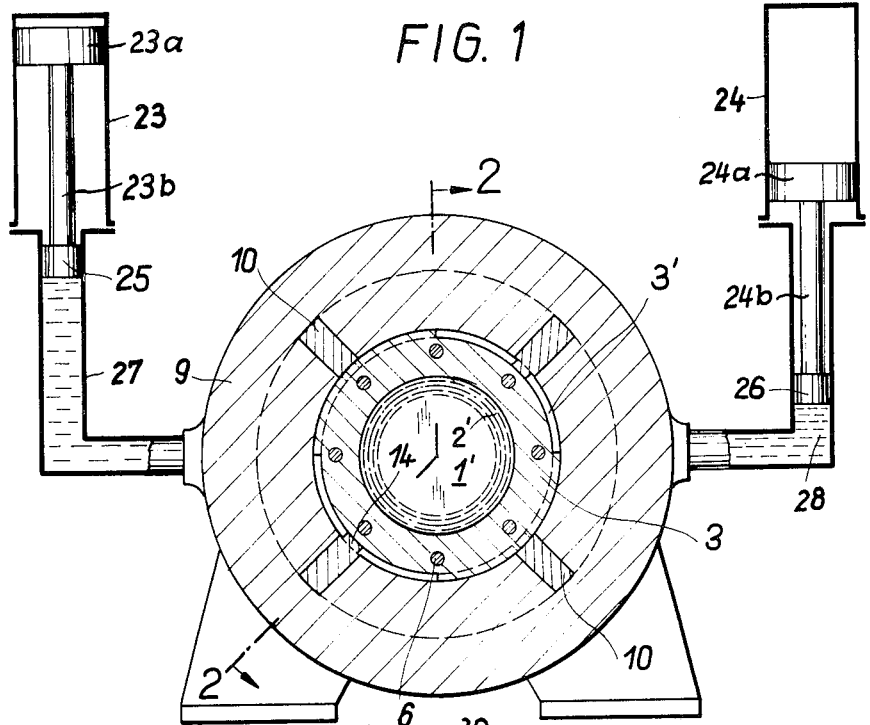
FIG. 1 is a cross section along the line I—I of FIG. 2 and shows a two-cylinder internal combustion engine with two reciprocable displacement members and a rotor.
Figure 2:
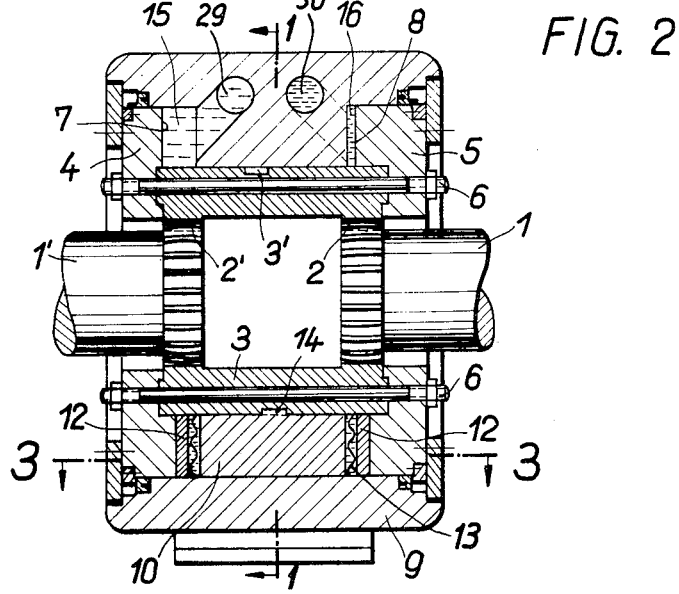
FIG. 2 is a section taken along the line II—II of FIG. 1.
Figure 3:
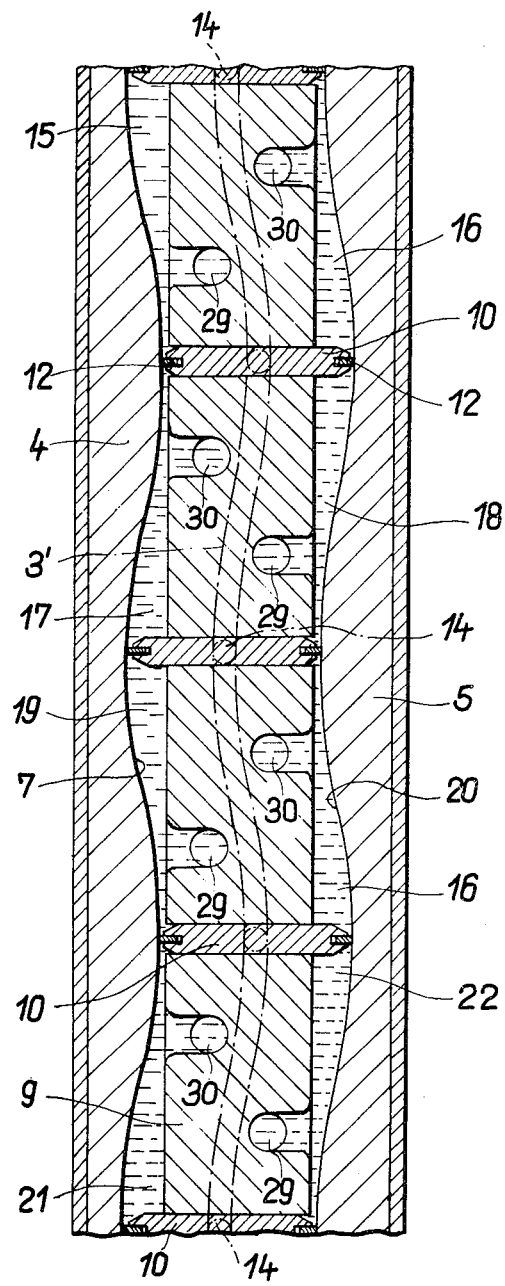
FIG. 3 illustrates a development of the section III—III of FIG. 2, which section is taken along a cylinder coaxial with the rotor.

Referring now to the drawing in detail, the arrangement shown in FIG. 1 comprises a two-piston cylinder internal combustion engine, the pistons 23a, 24a of which are reciprocably guided in cylinders 23 and 24 respectively. Said pistons 23a, 24a are, by means of piston rods 23b, 24b conected to displacement pistons 25, 26 respectively which are guided in cylinders 27, 28 connected to the rotor housing 9. The rotor comprises a bushing 3 and two annular end discs 4, 5 which are held together by tie-rods 6. Bushing 3 is by means of arcuate teeth 2, 2' connected to two parts 1, 1' of the drive shaft. The circumferential surfaces of bushing 3 and discs 4, 5 snugly engage corresponding cylindrical running surfaces of rotor housing 9. The inner sides of discs 4, 5 are provided with milled-out sections which in the development of FIG. 3 have sine-shaped confining surfaces 7, 8 which over the entire circumference are axially spaced from each other by the same distance. Four grooves uniformly distributed over the circumference of housing 9 have sliding members 10 axially displaceably mounted therein. The end faces of said sliding members 10 are provided with radial grooves in which sealing strips 12 are guided which by means of springs 13 are held in engagement with the guiding surfaces 7, 8. The corresponding guiding of the sliding members 10 is effected by means of studs 14 thereon which engage a groove 3' parallel to the surfaces 7, 8. In this way, the milled-out sections are on each side divided into four pressure chambers 15, 17, 19, 21, and 16, 18, 20, and 22, respectively. Passages 29 provided in housing 9 establish communication between the cylinder 26 of one of the displacement members with the pressure chambers 15, 18, 19, 22. Two pairs of said pressure chambers are arranged on one side and two pairs are arranged on the other side of the rotor while being offset with regard to each other by 90°. The cylinder 27 of the other displacement member is by means of passages 30 in housing 9 connected with the other pressure chambers 16, 17, 20 and 21.

As will be evident from FIGS. 4 to 8, the two side surfaces 31, 32 of each sliding member 10 have two shallow recesses 33, 34 and 35, 36 respectively. These recesses are symmetrically arranged with regard to the center of the sliding member in such a way that when the sliding member occupies its central position shown in FIG. 4, said recesses are evenly spaced from the end surfaces of housing 9. The guiding surfaces 34, 38 of housing 9, which are engaged by the side surfaces 31, 32 of the sliding member are likewise provided with two shallow recesses 39, 40 and 41, 42 respectively. These recesses have the same width as the recesses 33 and 36 and are likewise symmetrically arranged with regard to the center of the housing, however, so that when the sliding member occupies its central position shown in FIG. 4, the recesses 39, 40; 41, 42 are spaced from the end walls of housing 9 by a greater distance than the corresponding distances of the respective recesses 33, 34, 35; 36. Consequently in the central position of the sliding member as shown in FIG. 4, each recess in housing 9, for instance 39, overlaps a recess in the sliding member, for instance 33. Each of the recesses in housing 9 communicates through a bore with that pressure chamber which is located at that side of housing 9 which is remote from the recess, and on the same side of the sliding member as said recess. Thus, recesses 39 and 40 communicate through bores 43, 44 respectively with chambers 18, 15, and the recesses 41 and 42 communicate through bores 45 and 46, respectively with the chambers 16 and 17.

In the central position of the sliding member as shown in FIG. 4, the two ends of sliding member 10 protrude to the same extent beyond the end faces of housing 9. It is assumed that a high fluid pressure prevails in chambers 15 and 18. The force produced by this pressure and acting upon the respective end faces of the sliding member 10 is designated with the character $P_0$. The moment of this pair of forces tends to tilt the sliding member in counter-clockwise direction. If the above-mentioned relief were lacking, this moment would at the respective edges of the guiding surfaces 37, 38 produce considerable bearing forces $A_0$. These forces, however, are approximately balanced by the forces $E_0$ produced by the pressure fluid in recesses 33, 39; 34, 40, inasmuch as these recesses communicate through passages 43, 44 with the pressure chambers 18, 15 respectively.

When sliding member 10 is displaced for instance toward the left, to the position shown in FIG. 5, the surface under the load of the fluid pressure and pertaining to chamber 15 will be increased. The resultant force $P_1$ acting upon said surface exerts upon sliding member 10 a moment with a greater lever arm than does the force $P_0$ in the position of FIG. 4. At the right-hand end, the pressure fluid in pressure chamber 18 acts only upon a relatively small end face of the sliding member, and force $P_2$ resulting therefrom acts upon the sliding member with a shorter lever arm than does force $P_0$ in the central position of the sliding member according to FIG. 4. According to this ratio of the lever arms, the bearing force $A_2$ at the right-hand edge of guiding surface 38 would be less than the bearing surface $A_1$ at the left-hand edge of the guiding surface 37. This fact has been taken care of by the fact that in view of the displacement of the sliding member toward the left, the two recesses 34 and 40 overlap each other nearly completely, whereas the recesses 33 and 39 overlap each other only slightly, so that the total effective surface of the pressure fluid in recesses 34, 40 is less than in the central position of the sliding member according to FIG. 4, and the total effective surface of the pressure fluid in recesses 33, 39 is considerably greater than that in the central position according to FIG. 4. Accordingly, the relieving force $E_1$ effective in recesses 33, 39 is considerably greater than the relieving force $E_2$ in recesses 34, 40. By correspondingly dimensioning and arranging the various recesses, it is possible to bring about that the two relieving forces $E_1$, $E_2$ nearly completely balance the effect of the forces $P_1$, $P_2$ so that the bearing surfaces $A_1$, $A_2$ nearly disappear. By corresponding dimensioning and arrangement it is possible to obtain said nearly complete balance at all occurring positions of the sliding member.

Under the described conditions of operation, the recesses 35, 41 and 36, 42 hardly influence the force relationship inasmuch as the chambers 17, 16 communicating therewith are not under pressure. When, however, in conformity with the periodic pressure change in cylinders 26, 27 of the displacement member, chambers 17, 16 are supplied with pressure fluid under high pressure, whereas a low fluid pressure only prevails in chambers 15, 18, the chambers 35, 41 and 36, 42 perform the same task as in the above-described condition of operation is performed by chambers 33, 39 and 34, 40.

At any rate, the arrangement of the recesses as described above brings about that under consideration of all influences in all positions of the sliding member, the tilting moments acting from the outside upon the sliding member will be nearly completely balanced by the counter moments acting from the respective recesses so that the sliding member moves almost without any friction.

In connection with the present invention, it is also to be noted that the liquid in the chambers for instance 15 and 18 in which at the respective time a high pressure prevails, also acts upon the end faces of the sliding member, and more specifically, upon two diagonally oppositely located sections of the end faces. The resulting forces are in FIGS. 4 and 5 designated with the character S. While they act counter to the tilting moments of forces $P_0$, $P_1$, $P_2$, they will in view of the corresponding short level arm produce a relatively small moment only, which in the above fundamental discussion could be neglected.

The bores which establish communication between the pairs of recesses in the sliding member 10 and in housing 9 with the respective pressure chambers may also be arranged differently, from those of FIGS. 4 and 5. Thus, according to FIGS. 7 and 8, for instance each of the four recesses 33, 34, 35, 36 in the sliding member is through a bore 47, 48, 49, 50 provided in sliding member 10 respectively connected with that pressure chamber 15, 18, 17, 16, which is located on that side of housing 9 which is adjacent to the respective recess and on that side of the sliding member which is located opposite the respective recess. Inasmuch as in the diagonally oppositely located pressure chambers, for instance 15 and 18, always the same pressures prevail, this arrangement of the bores will bring about the same result as that of FIGS. 4 and 5.

It is, of course, to be understood that the present invention is, by no means, limited to the particular constructions shown in the drawings but also comprises any modifications within the scope of the appended claims.

What I claim is:

1. A converter for converting a reciprocatory movement into a rotary movement and vice versa: which comprises an annular housing with guiding surfaces extending in axial direction thereof, sliding members respectively reciprocably guided along its sides in said housing by said guiding surfaces so as to be movable beyond the sides of said housing, each of said transverse guiding surfaces of said housing having two recesses therein spaced from each other in axial direction of said tubular housing, each of those surfaces of each of said guiding means which face the respective adjacent guiding surfaces of said housing likewise being provided with two recesses spaced from each other in axial direction of said housing, the respective adjacent recesses in said housing surfaces and said guiding member surfaces being adapted in certain positions of the respective guiding member pertaining thereto partially to overlap each other, and conduit means communicating with said recesses in overlapped condition thereof for conveying pressure fluid acting on the respective guiding member to the surfaces of the respective overlapping recesses, the overlapping being such that the total effective surface acted upon by pressure fluid in the respective overlapping recesses increases with the outward movement of the respective sliding member beyond the lateral surfaces of said housing.

2. In a converter for converting a reciprocatory movement into a rotary movement and vice versa: an annular housing with axially extending grooves on the inner periphery of said housing, a plurality of sliding members respectively reciprocably arranged in said grooves, said sliding members when occupying their central position in their respective grooves substantially equally protruding beyond the side walls of said housing, means rotatable relative to said housing and respectively arranged laterally of the side walls of said housing and together therewith confining fluid chambers separated from each other by the protruding end portions of said sliding members, each of the side walls of each of said grooves having two recesses therein spaced from each other in longitudinal direction of the sliding member in the respective groove, each of the sides of each of said sliding members facing the respective adjacent recesses being provided with two recesses spaced from each other in the longitudinal direction of the respective sliding member by a distance greater than the spacing of the adjacent recesses in said housing but so as to communicate with the respective adjacent recesses in said housing, first fluid conduit means leading from one and the same first side of said housing and on opposite sides of the respective sliding member to those recesses in said housing which are adjacent to said sliding member but remote from said first side of said housing, and second conduit means leading from the second side of said housing opposite said first side to those recesses in said housing which are adjacent said same respective sliding member and remote from said second side of said housing.

3. In a converter for converting a reciprocatory movement into a rotary movement and vice versa: an annular housing with axially extending grooves on the inner periphery of said housing, a plurality of sliding members respectively reciprocably arranged in said grooves, said sliding members when occupying their central position in their respective grooves substantially equally protruding beyond the side walls of said housing, means rotatable relative to said housing and respectively arranged laterally of the side walls of said housing and together therewith confining fluid chambers separated from each other by the protruding end portions of said sliding members, each of the side walls of each of said grooves having two recesses therein spaced from each other in longitudinal direction of the sliding member in the respective groove, each of the sides of each of said sliding members facing the respective adjacent recesses being provided with two recesses spaced from each other in the longitudinal direction of the respective sliding member by a distance greater than the spacing of the adjacent recesses in said housing but so as to communicate with the respective adjacent recesses in said housing, each of said sliding members having a pair of first bores therethrough leading from the recesses on one and the same side thereof to the opposite side of the sliding member near the respective adjacent end of the latter, said sliding member also having a pair of second bores therethrough leading from the recesses on said opposite side of the same sliding member to said one side thereof near the respective adjacent end of said same sliding member.

No references cited.

JULIUS E. WEST, *Primary Examiner.*